March 24, 1925.
L. F. HOFFMAN
FILTER FOR AIR LINES AND THE LIKE
Filed Sept. 7, 1923
1,531,096
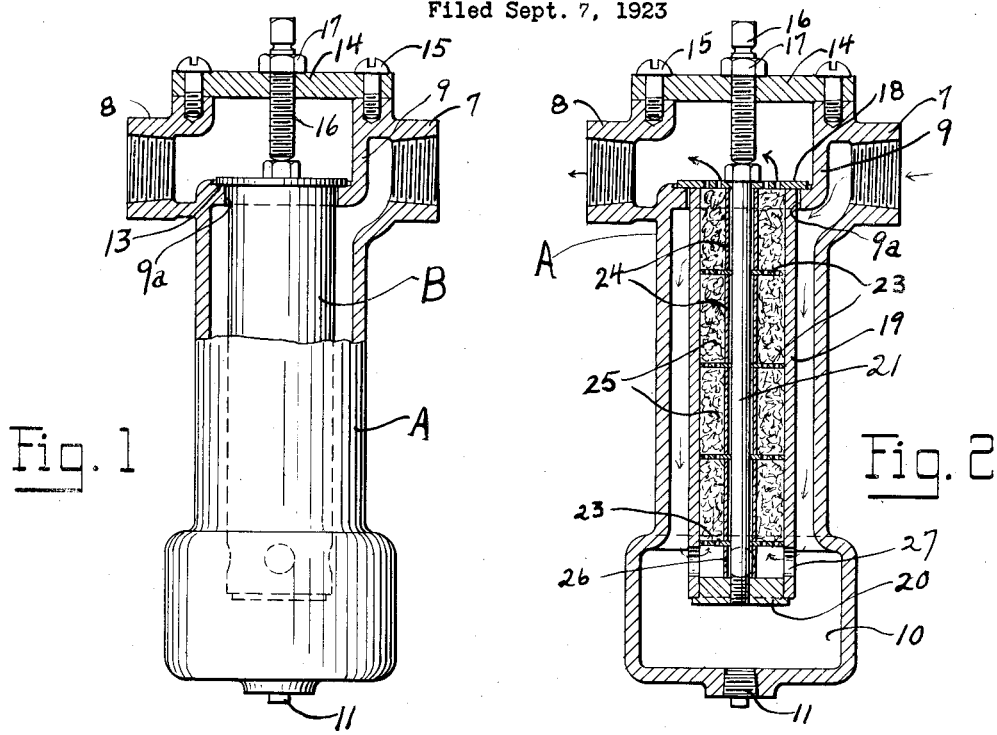
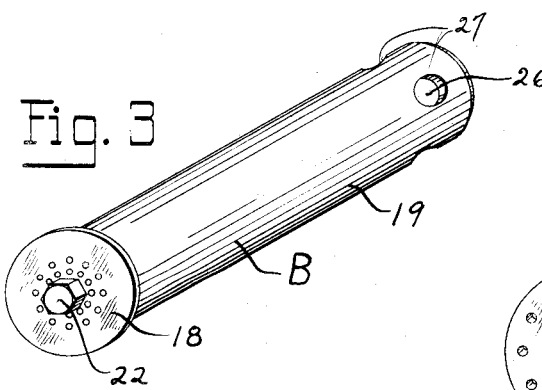
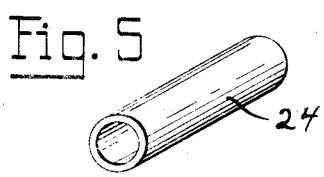
INVENTOR.
Leon F. Hoffman
BY Ira L. Nickerson
his ATTORNEY.

Patented Mar. 24, 1925.

1,531,096

UNITED STATES PATENT OFFICE.

LEON F. HOFFMAN, OF FRANKLIN, PENNSYLVANIA, ASSIGNOR TO CHICAGO PNEUMATIC TOOL COMPANY, OF NEW YORK, N. Y., A CORPORATION OF NEW JERSEY.

FILTER FOR AIR LINES AND THE LIKE.

Application filed September 7, 1923. Serial No. 661,380.

*To all whom it may concern:*

Be it known that I, LEON F. HOFFMAN, a citizen of the United States of America, and resident of Franklin, in the county of Venango and State of Pennsylvania, have invented new and useful Improvements in Filters for Air Lines and the like, of which the following is a specification.

This invention relates to apparatus for filtering fluids and more particularly to devices for removing foreign matter in the form of solids and liquids such as dust, grit, water, oil, etc. from gases. It is adapted for use wherever needed or desired but is particularly designed for use in the air lines of air compressors which lead to unloading apparatus therefor, typical apparatus of this kind being shown in U. S. Patent No. 1,224,272 issued to William H. Callan et al May 1, 1917.

One object of the invention is to provide an efficient filter for this purpose characterized by simplicity and ease of manufacture and assembly, thereby permitting the same to be produced and sold at a reasonable price. Other objects will be apparent from the detailed description which follows:

In order to illustrate the invention one concrete embodiment thereof is shown in the accompanying drawings in which:

Figure 1 is a side elevational view with the outer casing partly cut away to show the filter cartridge;

Figure 2 is a vertical sectional view of the parts shown in Figure 1;

Figure 3 is a perspective view of the filter cartridge; and

Figures 4 and 5 are perspective views showing details of the cartridge structure.

The embodiment of the invention chosen for the purpose of illustration comprises the casing A open at one end and provided adjacent its open end with an inlet port 7 and an outlet port 8, both adapted for pipe connections. Within the casing a partition 9 having an opening 9ª therethrough interferes with direct communication between the inlet and outlet ports and divides the casing into two chambers, the inlet chamber being the larger and of a size and shape to form at its lower end a receptacle 10 for water, oil or other fluids separated from the air or other gas passing through the filter. A screw plug 11 permits the draining of this receptacle. The filtering of fluid through casing A is effected by a filter cartridge B supported within the casing in a manner to close the opening 9ª in partition 9. As shown and by preference the filter cartridge B is supported in spaced relation to the walls of the casing A. One way of effecting this is to provide a projecting flange 13 on the cartridge arranged to engage the partition 9 adjacent the opening 9ª. A cover 14 secured in place by screws 15 closes the open end of casing A in an airtight manner and has suitable means, such as a set screw 16, provided with a lock nut 17, arranged to engage filter cartridge B to securely retain the latter within the casing.

The filter cartridge B as shown is cylindrical but it may be of any suitable or desired shape in transverse section, the opening 9ª being made to conform thereto. While the supporting flange 13 may be integral with the cartridge, for convenience and economy in manufacture it preferably forms part of an end cap or filter cap plate 18, which is of greater diameter than the cartridge. Hence, as disclosed in Figure 2, the filter cartridge B comprises a tubular holder 19, one end of which is closed by cap 18, and the other by a plug 20, partly fitting within the end thereof. These closures of holder 19 are interconnected and secured to the holder by a bolt or stud 21 passing axially therethrough, the head 22 of which engages cap 18 and the opposite end has threaded engagement with plug 20. Within holder 19 a plurality of perforated filter plates 23 are supported on the bolt 21 and maintained in spaced relation to each other by tubular spacers 24 having a sliding fit on the bolt. The spaces thus provided between the adjoining filter plates 23 and 18 are filled with any suitable filtering material, such for example as wool. A smaller spacer 26 separates the lowermost filter plate 23 from plug 20 providing a chamber to which air from the inlet chamber of casing A has access through a plurality of openings 27 in the holder 19.

The construction herein disclosed lends itself to ready assembly. Cartridge B is first assembled in the following manner: Bolt 21 with the filter cap 18 against the head 22 thereof is inserted into the end of the filter holder 19, a spacer 24 (Fig. 5) is slipped over and along the bolt into the holder, filter material 25 is packed therearound against cap 18, and a filter plate 23 (Fig. 4) is slipped along the bolt 21 until it contacts with the spacer 24. The insertion of spacers, filter material and plates is continued until the holder is filled as far as openings 27. The short spacer 26 and plug 20 are then applied, the bolt 22 being screwed home into the latter. The assembled filter cartridge is then passed as a unit endwise through the open end of casing and through the opening 9ª of partition 9 into the inlet chamber until the projecting portion of the cap 18 contacts with the partition and supports the cartridge therein. Cover 14 is applied to casing A and screw 16 thereon is set up against the bolt head 22, whereby the filter cartridge is securely held within casing A. The assembled air filter is then ready for installation in an air line. In operation air entering through inlet port 7 passes downwardly about the exterior of the filter cartridge to the lower end of casing A, thence through openings 27, up through the filter cartridge, out through the perforations on cap 18, and thence through the outlet 8, as indicated by the arrows in Figure 2.

While what is now considered to be the preferred form of the invention is herein disclosed, it is to be understood that the invention is not limited to the specific form shown but covers all modifications and adaptations within the scope of the appended claims.

Having now fully described my invention what I claim as new and desire to secure by Letters Patent is:

1. A filter comprising a casing, a partition therein having an opening therethrough, a filter cartridge within said casing arranged to close said opening, said cartridge comprising a tubular holder having open ends, closures for said open ends, one of said closures being a filter cap of greater diameter than said holder, a bolt in engagement with said cap extending through said holder and secured to the other of said closures, filter material in said holder between said closures, filter plates on said bolt separating said material, spacers for said plates on said bolt, the projecting portion of said filter cap being arranged to engage said partition, a cover for the open end of said casing, and a set screw on said cover engaging the head of said bolt for retaining said cartridge in place.

2. A filter cartridge adapted to be removably mounted in a partitioned filter casing, said cartridge comprising an open ended tubular holder, a perforated closure plate for one end of said holder adapted to engage the partition of the filter casing, a plug closure for the opposite end of said tubular holder, a bolt extending axially through said holder for maintaining said closures in place, a series of filter plates within the holder, tubular spacers loosely mounted on said bolt engaging said plates to maintain the latter in spaced relation, and filter material filling the chambers formed in said holder by said plates and spacers, said holder having radial ports adjacent its plug end leading to an open chamber between said plug closure and the nearest filter plate for the passage of fluid into or out of the filter cartridge.

Signed by me at Franklin, this first day of Sept. 1923.

LEON F. HOFFMAN.